United States Patent
Lovett et al.

(10) Patent No.: US 7,934,203 B2
(45) Date of Patent: Apr. 26, 2011

(54) PREPARING INSTRUCTION GROUPS FOR A PROCESSOR HAVING MULTIPLE ISSUE PORTS

(75) Inventors: William O. Lovett, Manchester (GB); David Haikney, Manchester (GB); Matthew Evans, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 11/139,232

(22) Filed: May 27, 2005

(65) Prior Publication Data

US 2006/0224863 A1 Oct. 5, 2006

(30) Foreign Application Priority Data

Mar. 30, 2005 (GB) .................. 0506469.6

(51) Int. Cl.
*G06F 9/45* (2006.01)
*G06F 9/30* (2006.01)
(52) U.S. Cl. ......... 717/136; 712/215; 712/200; 712/206
(58) Field of Classification Search .................. None
See application file for complete search history.

(56) References Cited

U.S. PATENT DOCUMENTS

| | | | | |
|---|---|---|---|---|
| 5,148,533 A | * | 9/1992 | Joyce et al. | 711/144 |
| 5,390,355 A | * | 2/1995 | Horst | 712/206 |
| 5,404,557 A | * | 4/1995 | Yamashita | 712/23 |
| 6,799,262 B1 | * | 9/2004 | Blandy et al. | 712/200 |
| 6,871,298 B1 | * | 3/2005 | Cavanaugh et al. | 714/33 |
| 2003/0200539 A1 | | 10/2003 | Fu et al. | |
| 2004/0054517 A1 | | 3/2004 | Altman et al. | |

FOREIGN PATENT DOCUMENTS

| | | |
|---|---|---|
| EP | 1457881 A | 9/2004 |
| WO | WO-99/19792 A1 | 4/1999 |
| WO | WO 00/22521 | 4/2000 |

OTHER PUBLICATIONS

Baraz et al., IA-32 Execution Layer: a two-phse dynamic translator designed to support IA-32 applications on Itanium-based systems, Proceedings of the 36th International Symposium on Microarchitecture (MICRO-36'03), IEEE, Dec. 3-5, 2003, pp. 191-201.

Zheng et al., PA-RISC to IA-64: Transparent execution, no recompilation, Computer, IEEE Service Center, vol. 33, No. 3, Mar. 2000, pp. 47-52.

(Continued)

*Primary Examiner* — Michael J Yigdall
*Assistant Examiner* — Evral Bodden
(74) *Attorney, Agent, or Firm* — Matthew B. Talpis; James L. Baudino

(57) ABSTRACT

During program code conversion, such as in a dynamic binary translator, automatic code generation provides target code 21 executable by a target processor 13. Multiple instruction ports 610 disperse a group of instructions to functional units 620 of the processor 13.
Disclosed is a mechanism of preparing an instruction group 606 using a plurality of pools 700 having a hierarchical structure 711-715. Each pool represents a different overlapping subset of the issue ports 610. Placing an instruction 600 into a particular pool 700 also reduces vacancies in any one or more subsidiary pools in the hierarchy. In a preferred embodiment, a counter value 702 is associated with each pool 700 to track vacancies. A valid instruction group 606 is formed by picking the placed instructions 600 from the pools 700. The instruction groups are generated accurately and automatically. Decoding errors and stalls are minimized or completely avoided.

37 Claims, 13 Drawing Sheets

OTHER PUBLICATIONS

"Intel Itanium Processor Reference Manual for Software Optimization", Doc. # 245473-003, Nov. 2001, Chapter 3. Available at http://www.intel.com.

"Intel Itanium 2 Processor Reference Manual for Software Development and Optimization", Doc. #251110-003, May 2004, Chapter 3. Available at http://www.intel.com.

* cited by examiner

PREPARING INSTRUCTION GROUPS FOR A PROCESSOR HAVING MULTIPLE ISSUE PORTS

BACKGROUND OF THE INVENTION

1. Technical Field

The present invention relates generally to the field of computers and computer software and, more particularly, to program code conversion methods and apparatus useful, for example, in code translators, emulators and accelerators which convert program code.

2. Description of Related Art

In both embedded and non-embedded CPUs, there are predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such CPUs would benefit from a software-oriented processor co-architecture.

Program code conversion methods and apparatus to facilitate such acceleration, translation and co-architecture capabilities are disclosed, for example, in published PCT application WO00/22521, and others.

SUMMARY

Performing program code conversion commonly brings overheads in the conversion process, compared with native execution of the subject program on a subject processor.

Many processors employ specialised functional units to perform specific tasks, such as a dedicated floating point arithmetic unit. A difficulty arises in that all processors have finite resources, and have restrictions as to the types of instructions which can be executed in particular functional units. Further, pipelined processors are able to work on two or more instructions simultaneously in single clock cycle. Such a processor is able to dispatch multiple instructions in one cycle. A difficulty arises in preparing multiple instructions for execution together as one group in a pipelined processor.

As a particular example, the Intel® Itanium® processor architecture employs a set of issue ports through which instructions are issued to functional execution units of the processor. As background to the present invention, preference is made, for example, to "Intel Itanium Processor Reference Manual for Software Optimization", document 245473-003, dated November 2001, available from www.intel.com, wherein chapter 3.0 discusses functional units and issue rules for the Itanium architecture. The issue rules determine the type, number and classes of instructions which can be executed by each type of functional unit. The Itanium processor provides at least integer, memory, floating point and branch-type (I, M, F or B-type) functional units which are fully pipelined, so that each functional unit can accept one new instruction per clock cycle (with certain exceptions).

Where an instruction group contains more instructions than there are execution units for that type of instruction, a spilt issue can arise whereby the processor stalls for one or more clock cycles until an appropriate unit becomes available. Stalls are inefficient, since some processor resources or functional units may well lie idle unnecessarily. Conversely, under-subscription of the functional units is also inefficient, i.e. producing groups of instructions which do not efficiently utilise the potential resources of the processor.

More recently, the Intel® Itanium® 2 processor has become available, which has a greater number of functional units and which is able to pipeline more instructions per cycle. Hence, it becomes increasingly difficult to achieve efficient instruction allocation. Reference is also made to "Intel Itanium 2 Processor Reference Manual for Software Development and Optimization", document 251110-003, dated May 2004, wherein chapter 3.0 describes the functional units and issue rules of the Itanium 2 processor.

In program code conversion, and particularly in the field of dynamic binary translation, executable code is generated automatically at run time. There is no opportunity for human intervention or review in order to improve the generated code, in particular to improve or adjust instruction groups.

The inventors have recognized that it would be desirable to improve efficiency when preparing an instruction group containing multiple instructions for dispersal in a single processor cycle, and more particularly to provide an efficient method of preparing instructions for dispersal through issue ports to functional units of a pipelined processor. Implementation of various methods described below permits the preparation of instruction groups which make effective use of the functional units of a processor.

According to the present invention there is provided an apparatus and method as set forth in the appended claims. Preferred features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In one aspect of the following description, there is provided a method of forming an instruction group for dispersal through a plurality of issue ports to functional units of a processor. A plurality of pools are provided, each pool being associated with one or more of the issue ports and including at least a first pool and a second pool having at least one issue port in common. Instructions are placed into the pools according to instruction type, wherein placing an instruction into the first pool also reduces occupancy of the second pool. An instruction group in then created from the placed instructions.

In another aspect of the description herein there is provided a method of preparing an instruction group of target instructions for dispersal through a plurality of issue ports to functional units of a target processor, from subject instructions executable by a subject processor. The method includes generating a block of target instructions from the subject instructions. A set of the target instructions are placed into a plurality of pools, each pool being associated with a subset of the issue ports in an overlapping hierarchical structure having superior narrower pools associated with fewer instruction ports than subsidiary wider pools. Availability in a subsidiary wider pool is reduced in response to each placing of one of the set of target instructions into a superior narrower pool in the hierarchical structure. An instruction group is formed from the placed set of target instructions.

The present invention also extends to a computing platform adapted to perform any of the methods discussed herein. Further, the present invention extends to a translator apparatus, and particularly a dynamic binary translator, configured to perform any of the methods discussed herein.

In some embodiments, the present invention is provided in dedicated hardware, such as an ASIC (Application-Specific Integrated Circuit). Also, the present invention extends to a computer readable storage medium containing instructions which, when implemented by a computing platform, perform any of the methods discussed herein. The storage medium is suitably a readily transportable storage such as a solid state medium (memory chip), optical disc or magnetic disc. The medium may also be any non-portable storage such as a hard disc in a network storage, server or desktop computer. The medium further may be an encoding into transmission signals, such as downloading from the Internet.

BRIEF DESCRIPTION OF THE DRAWINGS

The accompanying drawings, which are incorporated in and constitute a part of the specification, illustrate presently preferred implementations and are described as follows.

DETAILED DESCRIPTION OF THE PREFERRED EMBODIMENTS

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

In the terminology below, a subject program is intended to execute on a subject computing platform including a subject processor. A target computing platform including a target processor is used to execute the subject program, through a translator which performs dynamic program code conversion. The translator performs code conversion from subject code to target code, such that the target code is executable on the target computing platform.

Figure 1:
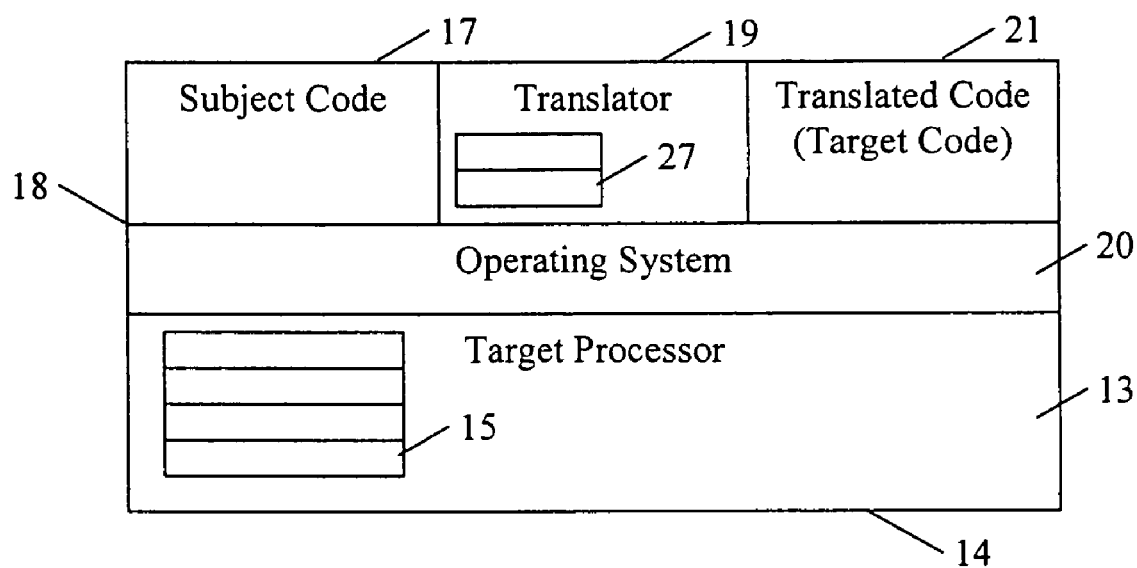
FIG. 1 is a block diagram illustrative of an apparatus wherein embodiments of the invention find application.

FIG. 1 illustrates an example target computing platform comprising a target processor 13 having a plurality of target registers 15, and a memory 18 to store a plurality of software components 17, 19, 20, 21, and 27. The software components include an operating system 20, subject code 17, translator code 19, and translated target code 21.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator 19, i.e., the compiled version of source code implementing the translator, and the translated code 21, i.e., the translation of the subject code 17 produced by the translator 19, run in conjunction with the operating system 20 running on the target processor 13, which is typically a microprocessor or other suitable computer.

It will be appreciated that the structure illustrated in FIG. 1 is exemplary only and that, for example, software, methods and processes according to the invention may be implemented in code residing within or beneath an operating system. The subject code 17, translator code 19, operating system 20, and storage mechanisms of the memory 18 may be any of a wide variety of types, as known to those skilled in the art.

In the apparatus according to FIG. 1, program code conversion is preferably performed dynamically, at run-time, while the target code 21 is running. The translator 19 runs inline with the translated program 21. The translator 19 is preferably employed as an application compiled for the target architecture. The subject program 17 is translated by the translator 19 at run-time to execute on the target architecture 14.

Running the subject program 17 through the translator 19 involves two different types of code that execute in an interleaved manner: the translator code 19; and the target code 21. The translator code 19 is generated such as by a compiler, prior to run-time, based on a high-level source code implementation of the translator 19. By contrast, the target code 21 is generated by the translator code 19, throughout run-time, based on the stored subject code 17 of the program being translated.

The subject program 17 is intended to run on a subject processor (not shown). In one embodiment, the translator 19 functions as an emulator. That is, the translator 19 emulates the subject processor, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject processor state is provided by components of the translator 19 and the target code 21. That is, the translator 19 stores the subject processor state in a variety of explicit programming language devices such as variables and/or objects. The compiler used to compile the translator 19 determines how the state and operations are implemented in target code. The target code 21, by comparison, provides subject processor state implicitly in the target registers 15 and in memory locations 18, which are manipulated by the target instructions of the target code 21. For example, the low-level representation of the global register store 27 is simply a region of allocated memory. In the source code of the translator 19, however, the global register store 27 is a data array or an object which can be accessed and manipulated at a higher level.

Figure 2:
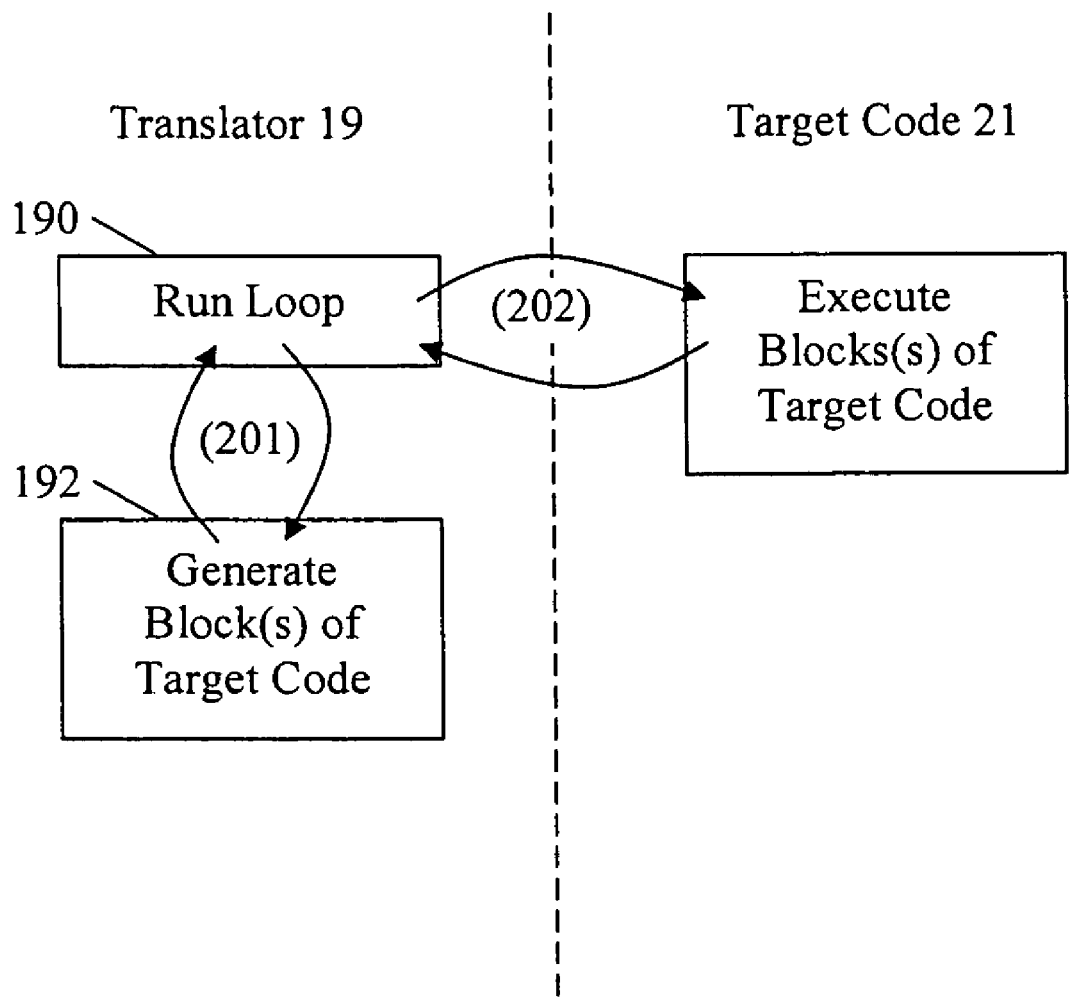
FIG. 2 is a schematic flow diagram illustrating execution control as employed in preferred embodiments of the present invention.

FIG. 2 is a schematic flow diagram illustrating execution control as employed in program code conversion according to preferred embodiments of the present invention.

As shown in FIG. 2, control initially resides with a translator control loop 190. In step 201, the control loop 190 calls a code generation function 192 of the translator 19, which translates a block of the subject code 17 into a corresponding block of translated code 21. Then, in step 202, that block of translated code 21 is executed on the target processor 13. In one preferred embodiment, the end of each block of translated code 21 contains instructions to return control back to the control loop 201. In other words, the steps of translating and executing the subject code are interlaced, such that portions of the subject program 17 are translated and then executed in turn.

The term "basic block" is familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a unique entry point and a last instruction at a unique exit point (such as a jump, call or branch instruction). The translator may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions (iso-block mode).

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture ("subject register"). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator code generation function 192.

Figure 3:
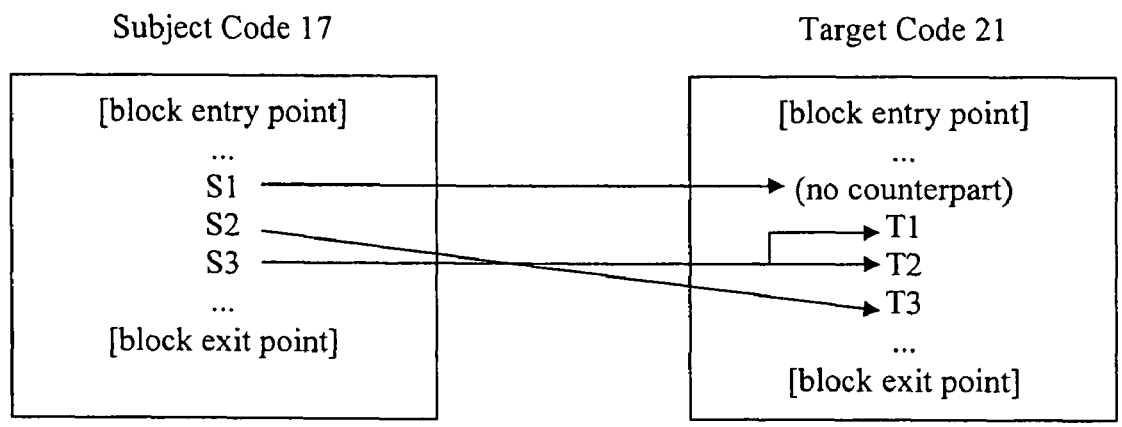
FIG. 3 is a schematic diagram showing program code conversion in preferred embodiments of the present invention.

FIG. 3 is a schematic diagram to show a relationship between instructions in a subject program and instructions in a target program, following program code conversion in preferred embodiments of the present invention.

In this example, subject instructions S1-S3 result in functionally equivalent target instructions T1-T3. The subject instruction S1 has been removed such as by a dead code elimination optimisation and has no counterpart in the generated target code. Subject instruction S2 results in one equivalent target instruction T3. By contrast, subject instruction S3 results in two target instructions T1 & T2. There may be a one to none, one to one, one to many or many to one relationship between the subject and target code instructions.

As also shown in FIG. 3, another commonly used optimisation is to perform code rescheduling, whereby an instruction sequence in the target code is different to the original sequence in the subject code. Here, the second subject instruction S2 has been rescheduled as the third target instruction T3.

Figure 4:
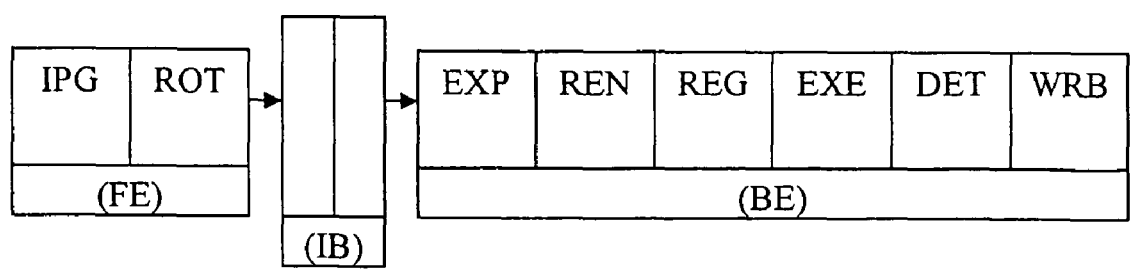
FIG. 4 is a schematic diagram of a core pipeline of an example pipelined processor.

FIG. 4 shows a core pipeline of an example pipelined processor, such as the Itanium® 2 processor. The core pipeline is separated into a front end (FE) and a back end (BE), separated by an instruction buffer (IB). The front end FE fetches up to six instructions per cycle. Similarly, the back end BE issues up to six instructions per cycle. Hence, the Itanium 2 processor is considered to issue six instructions per cycle. These six instructions are together termed an instruction group.

Figure 5:
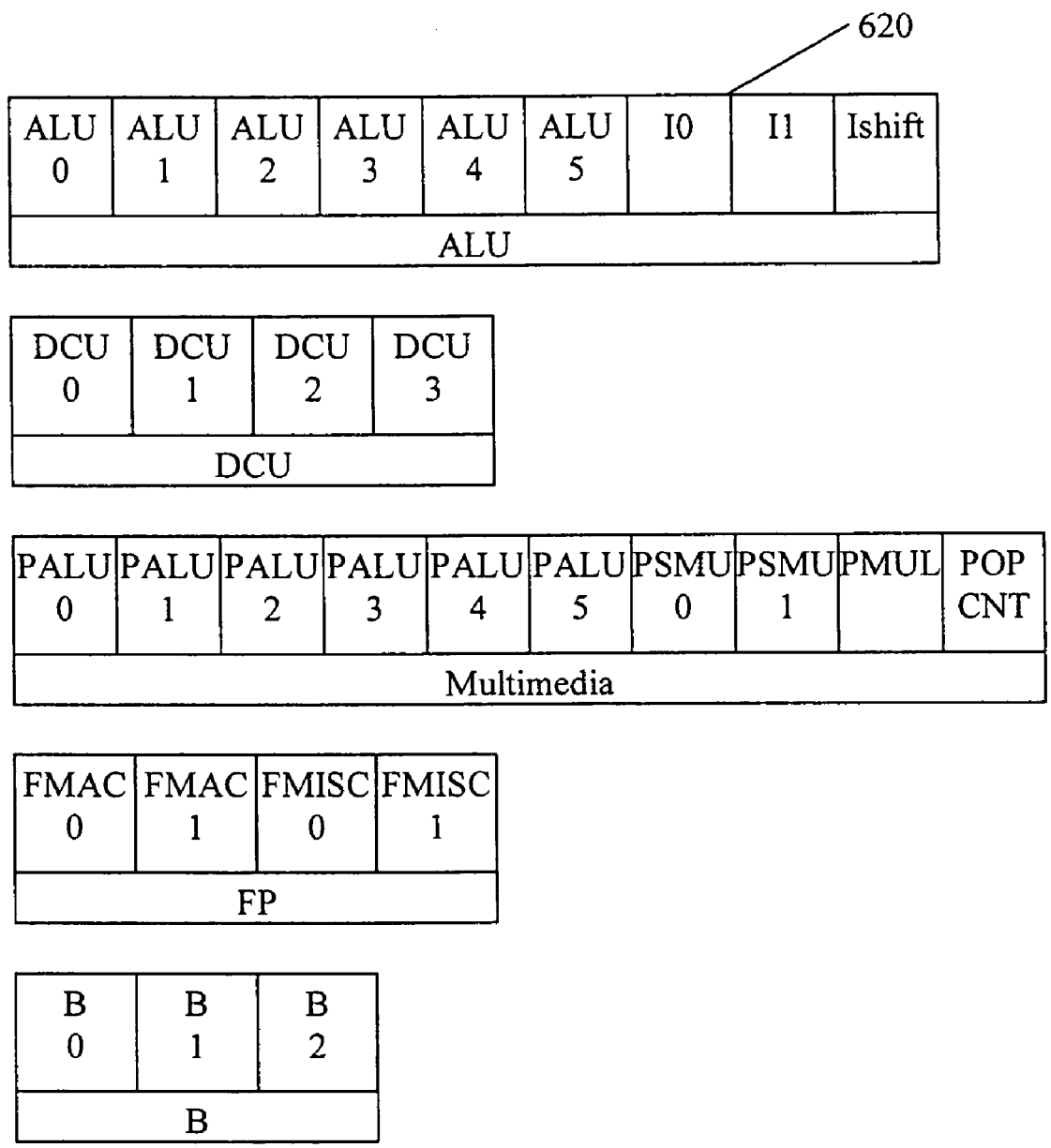
FIG. 5 is a schematic overview of functional units within an example processor.

FIG. 5 is a schematic representation showing functional execution units within an example Intel® Itanium® 2 processor. There are a large number of functional units 620 of various types. This allows many different combinations of instructions to be issued per cycle. However, since only six instructions may issue per cycle, only a portion of the processor's functional units 620 are used each cycle.

The Itanium 2 processor provides six general purpose arithmetic and logic units (ALU0, 1, 2, 3, 4, 5), two integer units (I0,I1), and one shift unit (Ishift) for general purpose shifts and other special shift instructions.

A data cache unit (DCU 0-4) provides four memory ports. Two of the memory-ports are generally used for load operations, and the other two are usually used for store operations.

There are six multi-media functional units (PALU0-5), two parallel shift units (PSMU0,1), one parallel multiply unit (PMUL), and one population count unit (POPCNT). These handle multi-media, parallel multiply and a particular POPCNT instruction type.

There are four floating-point functional units, comprising two FMAC units (FMAC 0,1) to execute floating-point multiply-adds, and two FMISC units (FMISC 1,0) to perform other floating-point operations.

There are three branch units (B0-2), enabling three branches to be executed per cycle.

Each of the functional units 620 is pipelined and can accept one new instruction per clock cycle. However, there are limits as to the number of instructions of each type which can be executed within a particular cycle.

Figure 6:
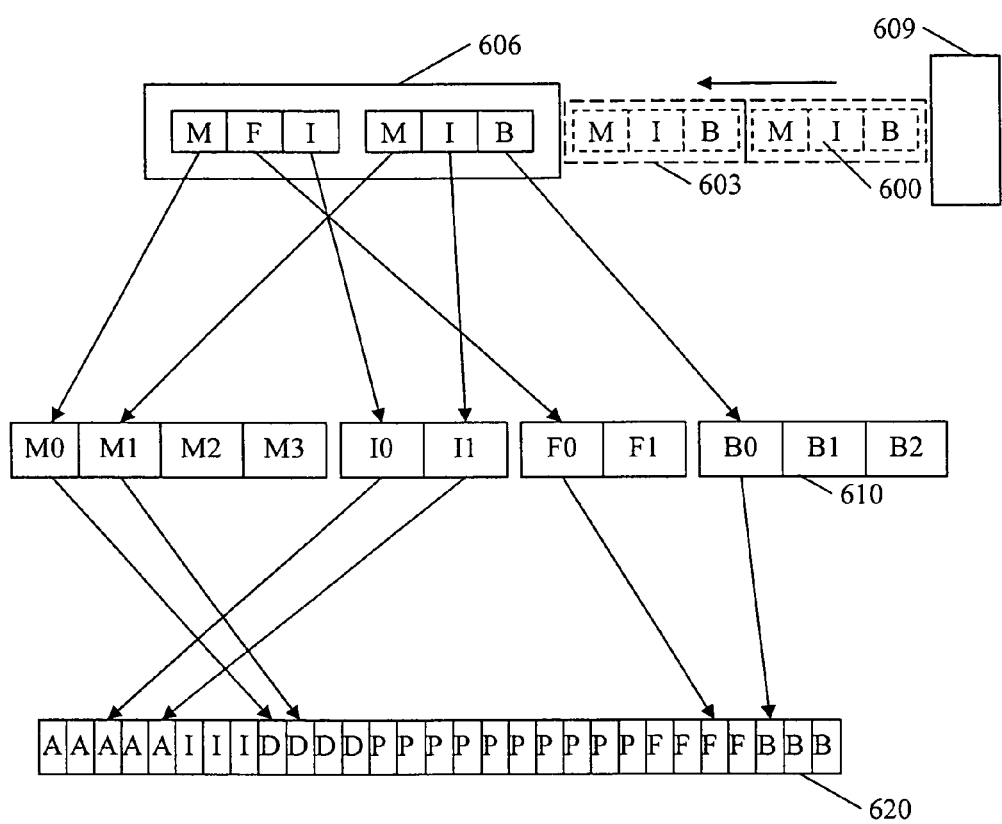
FIG. 6 is a schematic overview of instruction dispersal within an example processor.

FIG. 6 shows a schematic overview of instruction dispersal within a pipelined processor such as an Intel® Itanium® 2 processor.

As shown in FIG. 6, each instruction 600 forms part of a bundle 603 of three instructions. Six instructions 600 (i.e. two bundles) together form an instruction group 606. The instructions 600 are stored in an instruction cache 609. The front end FE fetches zero, one or two bundles 603 from the instruction cache 609 in each cycle, by a process known as bundle rotation.

Each instruction 600 is assigned to one of the functional units 620 through an issue port 610. There are fewer issue ports 610 than the number of functional units 620. As shown in FIG. 6, in this example there are 11 issue ports and 27 functional units. Ports M0, M1, M2, M3, I0, I1, F0 & F1 are each for non-branch instructions. Ports B0, B1, & B2 are for branch instructions. Dispersal is the process of allocating instructions 600 to functional units 620, and relies upon predetermined mappings of the instruction issue ports 610.

Each instruction group must firstly fulfil the issue rules for allocation to the issue ports, which are conveniently expressed as templates. That is, the number, type and position of the instructions in each instruction group (and within each bundle) must match one of a predetermined set of templates. Any group which does not match a template will be rejected. Usually, an exception or fault is reported and execution is terminated.

Assuming that the issue rules are met and a valid template presented, the instructions are then allocated to the issue ports 610.

An instruction is mapped to a subset of the issue ports based upon an instruction type (e.g. ALU, Memory, Integer etc). Then, dependent upon the position of the instruction within the instruction group, the instruction is mapped to a particular issue port within the subset. As an example, A-type instructions can be issued on all M and I ports, whereas I-type instructions can only issue to I ports. Further, the I ports are asymmetric, wherein some I-type instructions can only issue on port I0. Further, the M ports have many asymmetries, wherein certain M-type instructions can only issue on one or two of the memory ports.

The Itanium architecture uses a 128-bit encoding for each bundle 603, containing three 41-bit instructions 600 and a 5-bit template field. The template bits help the processor to decode and route the instructions. Also, the template bits indicate the location of stops that mark the end of each instruction group 606.

The instructions 600 are dispersed from the issue ports 610 to functional units 620 according to a set of dispersal rules. There are different rules for each of the different issue port types. When dispersing the instructions to the functional units, the processor views one or two bundles (each of three instructions) at a time.

When each of the instructions in a bundle has been issued, a bundle rotation occurs to bring a new bundle of instructions into the two-bundle window currently being considered. Either one or two bundles can be rotated. If a bundle is not successfully completed, then the processor stalls un-issued instructions in that bundle 603 to the next cycle. That way, processor resources eventually become available to execute the stalled instructions. The processor hardware does not re-order instructions to avoid stalls.

It is desired to prepare instruction groups which fulfil the issue rules (templates) and dispersal rules whenever possible. In particular, it is desired to minimise stalls. Also, it is desired to create code groups where the instructions make effective use of the available resources of the processor.

Further, in the context of program code conversion and particularly dynamic binary translation as discussed herein, there is a strong need for a mechanism to automatically create instruction groups, as will now be described in more detail below.

Figure 7:
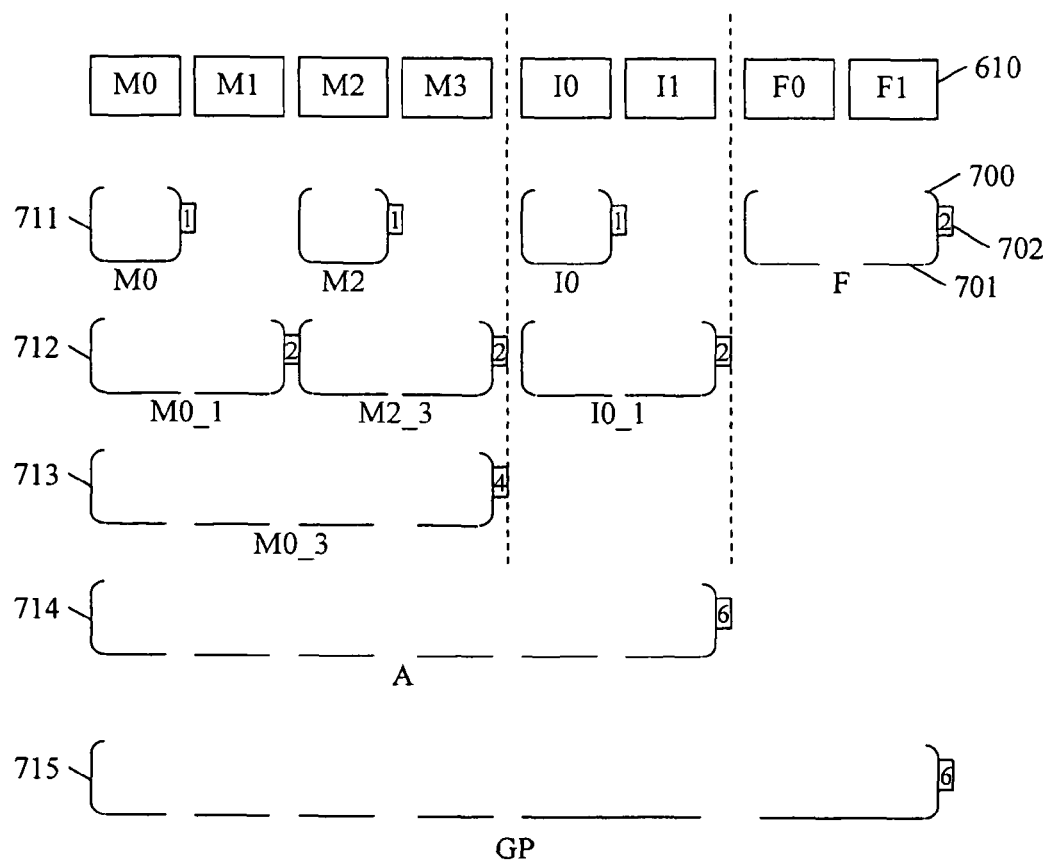
FIG. 7 is a schematic representation of a preferred mechanism of preparing instructions as employed in embodiments of the present invention.

FIG. 7 shows a preferred mechanism for preparing an instruction group. As shown in FIG. 7, a plurality of allocation pools 700 are provided. Each pool 700 is arranged to contain one or more instructions 600. Conveniently, each pool 700 comprises one or more instruction spaces 701.

Each of the pools 700 is associated with one or more of the issue ports 610. In the example of FIG. 7, pool M0 is associated with issue port M0, whilst pool F is associated with both issue port F0 and issue port F1. Similarly, pool M0_3 is associated with each of ports M0 to M3, while pool A covers any M or I port (M0, M1, M2, M3, I0 or I1).

The pools overlap, wholly or at least in part. That is, at least two of the pools 700 share a particular issue port 610 in common. As an example, a first pool M0 and a second pool M0_3 share the issue port M0 in common.

The pools 700 form a hierarchical structure. In this embodiment, the structure has first through fourth levels 711, 712, 713 and 714, respectively. In the hierarchical structure, a wide pool (e.g. pool M0_3) which relates to several issue ports 610 is subsidiary to a narrow pool (e.g. pool M0) which relates to fewer issue ports. The narrow pool (M0) and the wide pool (M0_3) have at least one issue port (M0) in common.

As another example, pool I0 is narrower than and is superior to pool I0_1, which in turn is superior to pool A. These pools I0, I0_1 and A share at least port I0 in common.

Figure 8:
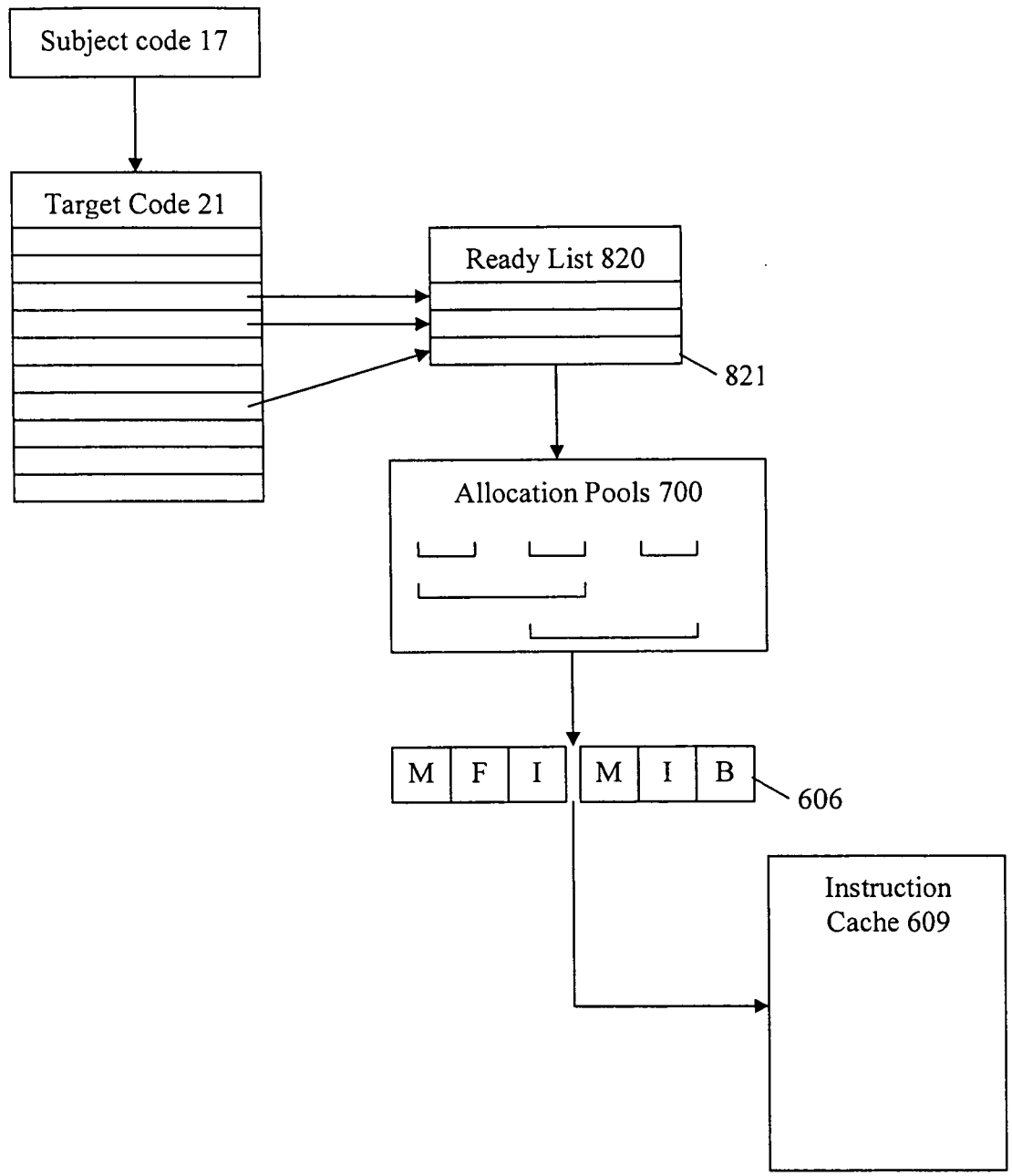
FIG. 8 is a schematic overview of instruction group preparation according to a preferred embodiment of the present invention.

FIG. 8 is a schematic overview of instruction group preparation according to a preferred embodiment of the present invention.

As shown in FIG. 8, a subject program 17 is converted into target code 21 (i.e. by the translator 19 of FIG. 1). Executable target code instructions 600 are prepared into a ready list 820. The ready list 820 contains target code instructions which are ready to be executed. Ideally, the instructions 600 in the ready list 820 are each independent, in that each instruction is executable independent of any other instruction in the ready list.

In the preferred embodiment, target code instructions are placed into the ready list once any dependencies have been resolved. That is, the target code instructions 21 are examined for dependency upon other instructions in the target code 21. As an example, the instruction LOAD R1, 0 (load register R1 with the constant 0) has no dependencies, whereas a following PUSH R1 (push the contents of register R1 to the stack) in this case is dependent on the LOAD instruction. Suitably, the PUSH instruction is added to the ready list only after the LOAD has been planted.

Instructions are taken from the ready list 820 and placed into the hierarchical pool structure 700, such as illustrated in FIG. 7. A parallel-executable instruction group (e.g. a set of six instructions in two bundles) is then formed from the placed instructions. The instruction group 606 is ready to be added to the instruction cache 609 for dispersal through the issue ports 610 to the functional units 620, as discussed above referring to FIG. 6. Usually, the prepared instruction group 606 is first stored, such as in memory 18. Suitably, the stored instruction groups are executed later in a complete target code block.

Figure 9:
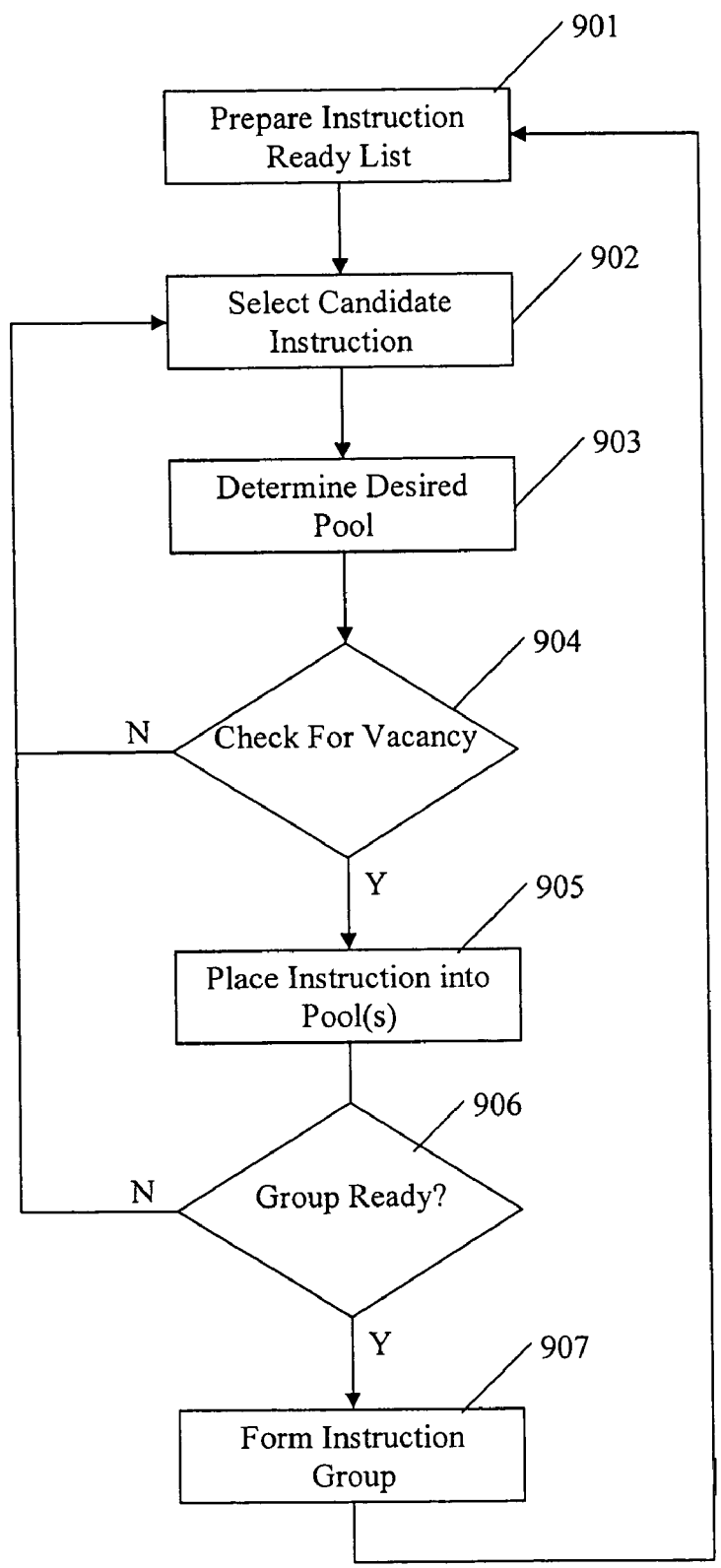
FIG. 9 is a schematic flow diagram of a preferred method of preparing an instruction group.

FIG. 9 is a schematic overview of a preferred method of preparing an instruction group, as employed during program code conversion and particularly dynamic binary translation in the preferred embodiments of the invention.

The ready list 820 of candidate instructions 821 is provided at step 901. A first candidate instruction 821 is selected from the ready list 820 at step 902. In one embodiment, the candidate instruction is selected based on age in the ready list (e.g. the oldest instruction in the list). In another embodiment, the instruction is selected based on latency. The execution times (latency) of instructions range from 1 to 24 cycles. Loads from memory which miss a cache, and check instructions (which are used for speculation), can take more than 50 cycles. Hence, in a preferred example, an instruction which takes longest to execute is selected in preference to instructions which execute in fewer clock cycles. In another particularly preferred embodiment, an instruction is selected based upon a cumulative latency of the instruction and any instructions which are dependent therefrom (e.g. a LOAD instruction has a cumulative latency which also includes the latency of a dependent PUSH instruction).

At step 903, an attempt is made to place the selected candidate instruction 821 into an appropriate available pool 700 in the allocation pool hierarchy. Firstly, a set of one or more appropriate pools is determined, according to an instruction type and appropriate issue port(s) for that instruction. For example, an "add" instruction can be issued through any of the issue ports M0-3 or I0-1 and is suitable to be placed into any pool which relates to any of these issue ports. Then, the desired pool is selected from the set of appropriate pools. In the example structure of FIG. 7, the desired pool for an "add" instruction is selected from amongst the set of appropriate pools M0, M2, I0, M0_1, M2_3, I0_1, M0_3 or A. By contrast, a "getF" instruction can only be issued through port I0 and must be placed in a pool associated with that port. In this example, the I0 pool is the only possible desired pool.

At step 904 is it determined whether a desired pool 700 is able to receive the instruction, e.g. has a vacant instruction space 701. Also, this step comprises checking that each dependent subsidiary pool is not full. The hierarchical structure determines which of the pools which are inferior to the desired pool. For the example "getF" instruction, the pools I0_1 and A are checked in addition to the desired pool I0.

If the desired pool and each of the subsidiary pools is available, then the instruction is successfully placed at step 905. Placing the candidate instruction reduces occupancy of the pool into which the instruction is placed. Also, placing the instruction reduces occupancy of each of the inferior pools which are subsidiary to the placed pool.

If an appropriate pool is not available, then the candidate instruction is rejected. A new candidate instruction is selected from the ready list 820 and the above steps are repeated.

At step 906, it is determined whether an instruction group is ready from the set of instructions placed in the allocation pool hierarchy 700. If no, then the next instruction is selected at step 902. If yes, then the placed instructions are formed into an instruction group at step 907. The ready list is then updated (step 902) to account for the placed instructions, and the process repeated. In particular, new target instructions are added to the ready list where dependences are resolved by the instructions which have been prepared into instruction groups ready to be executed.

An instruction group is formed once a predetermined set of instructions have been placed, i.e. six instructions to form two bundles. Alternatively, an instruction group is formed once no further instructions can be placed, i.e. because none of the candidate instructions from the ready list are suitable for the vacant pools, or because the ready list is now empty. Suitably, NoOPs ("non-operations" or non-operative instructions) are used to fill a partially-complete instruction group.

The process may terminate once the ready list is completely empty, and there are no further target instructions to prepare. In the preferred embodiment, the target code instructions 21 represent one block of target code, such as a basic block, group block or iso-block. Hence, the preparation process finishes once all of the instructions in this block of target code have been prepared into instruction groups.

The preferred method will now be illustrated in more detail with reference to a worked example shown in FIGS. 10 and 11.

Figure 10:
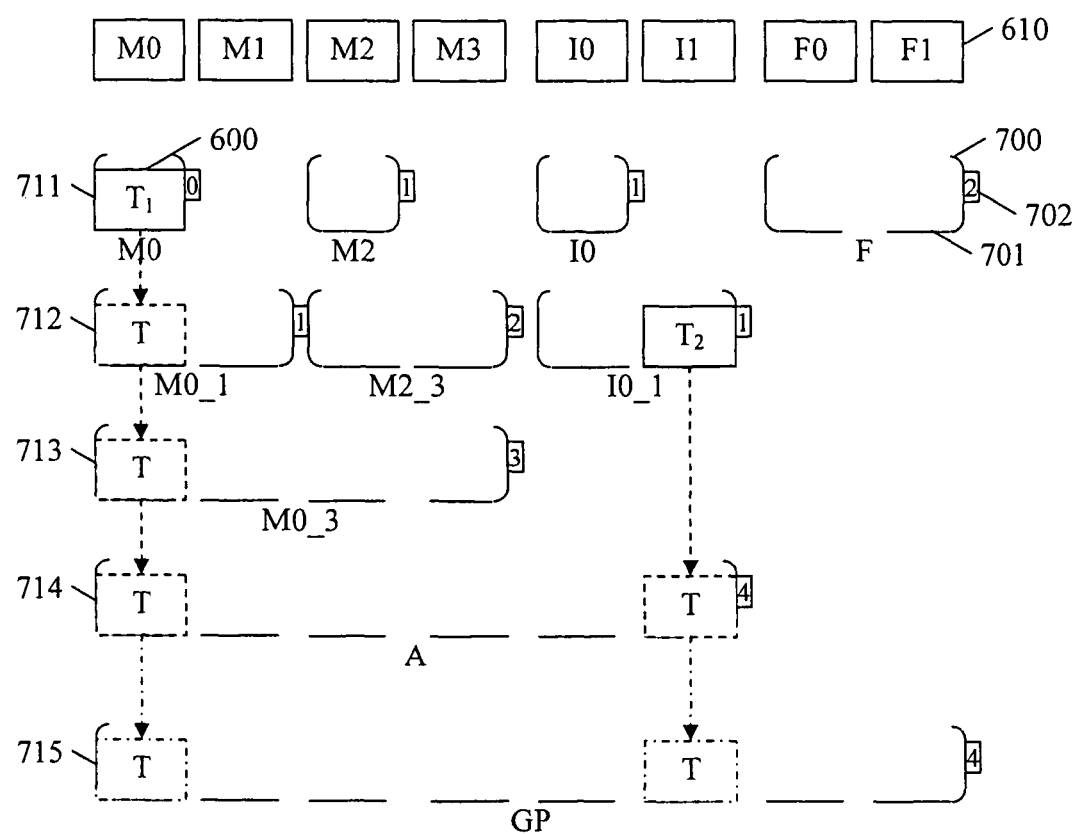
FIG. 10 shows a preferred mechanism with a partially complete example instruction group.

Referring to FIG. 10, an instruction 600 (here represented by the letter "T") is allocated to a desired pool 700 to occupy an available instruction space 701. In the FIG. 10 example, a first instruction $T_1$ is a memory-type M instruction which is placed in pool M0. This pool can only accept one instruction, and hence instruction $T_1$ fills pool M0.

As shown in FIG. 10, occupancy of each dependent pool (M0_1, M0_3, A) is also reduced, i.e. an instruction space 701 is marked as filled in response to the placed instruction $T_1$ in the superior pool M0. That is, when an instruction is placed into an available pool, vacancy of each dependent pool in the zero or more lower layers is reduced as a result of the placed instruction.

A second instruction $T_2$ is now placed, this time being a I-type instruction which desirably fills an instruction space in pool I0_1 in the second level 712. A corresponding instruction space in the dependent pool A in level 714 is also marked as occupied.

Figures 11, 12:
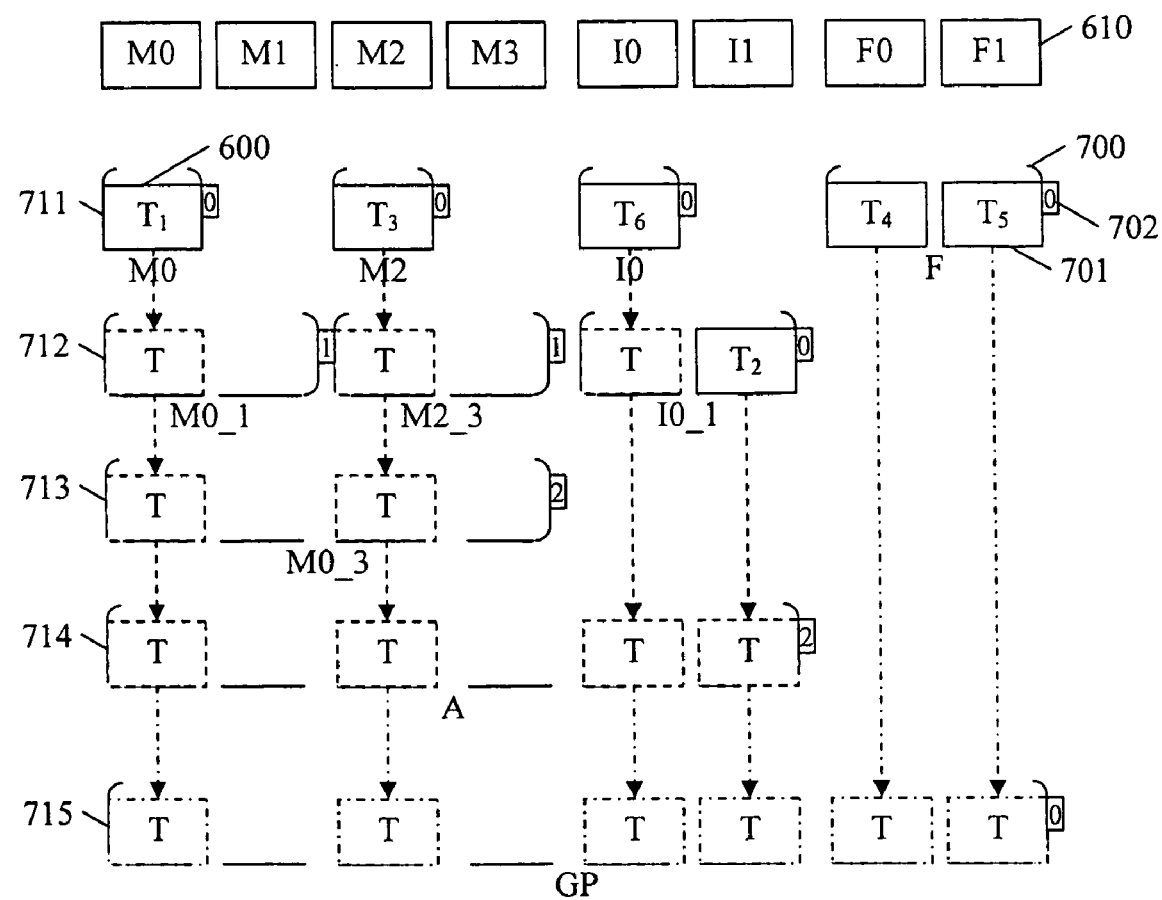
FIG. 11 shows a preferred mechanism with a complete instruction group.
FIG. 12 shows an example instruction group.

FIG. 11 shows an example of instructions placed ready to form a complete instruction group. Each of the instructions $T_1$-$T_6$ is placed into a respective pool.

Referring to FIGS. 7, 10 and 11, in the preferred embodiment, an additional lowermost group pool 715 is provided to represent an instruction group. The group pool 715 suitably has six instruction spaces (the maximum for an instruction group). No instructions are placed directly into the group pool 715. Instead, the group pool provides a convenient mechanism to confirm that six instructions have been correctly and validly placed in the superior level pools.

For flexibility, it is desirable that instructions are placed into the lowermost applicable pool. That is, an "add" instruction can be issued to any of issue ports M0-3 or I0-1, and is ideally placed in the A pool. By contrast, a "getF" instruction can only be issued through issue port I0 and is allocated to pool I0, if available.

Referring again to FIGS. 7, 10 and 11, each pool 700 is conveniently associated with a count value 702. The count value 702 is suitably an integer value corresponding to the number of instruction spaces 701 available within the pool 700.

In an alternate embodiment, one or more of the pools is given a restricted count value, less than the maximum occupancy of the pool. That is, maximum occupancy for at least one of the plurality of pools is restricted to less than an absolute maximum as determined by the issue ports associated with the one pool. Alternatively, the absolute maximum occupancy is determined with respect to the instruction types. In the illustrated example pools, the M0_3 pool has an absolute maximum occupancy of 4 M-type instructions corresponding to issue ports M0 through M3. However, pool M0_3 is preferably restricted such as to a count of "2", such that only two M-type instructions can be placed in any one instruction group. Restricting the number of certain types of instructions to below the system maximum allows more efficiently executable code to be generated in some circumstances. That is, issuing a sequence of instruction groups having many "M" instructions in practice may be less efficient than issuing groups each with at most two "M" instructions. The restricted count value enables the instruction group composition to be adjusted and controlled.

The counter 702 is adjusted each time an instruction is placed in the pool 700. Also, the counter is adjusted each time an instruction is added in a higher pool, as shown in the examples of FIGS. 10 and 11. The counter 702 provides a simple and convenient mechanism to determine whether a pool, or a dependent pool, is full. In a preferred embodiment, the counter is initialised to a predetermined value (i.e. the maximum vacancy of the respective pool, or a restricted value), and is decremented by one for each placed instruction. This allows an efficient "equal or less than zero" type comparison to determine whether a particular pool is full (i.e. has a vacant instruction count equal to or less than zero).

The group pool 715 is likewise provided with a counter value 702, which is initialised such as to six as the maximum number of instructions allowed in a single group, and decremented for each placed instruction.

In the preferred embodiment, the placed set of instructions (i.e. up to $T_1$-$T_6$) is formed into an instruction group by picking the instructions. The preferred order begins with the most restrictive pools, which are in the most superior level 711. These instructions have priority when the group is prepared, in order that these most restrictive instructions have access to the appropriate issue port(s) 610 when the instruction group is dispersed. By placing instructions to the lowermost (widest) applicable pool, the most flexible instruction are held in reserve, allowing less restrictive instructions occurring later in a sequence of code a better opportunity to be placed in an appropriate issue port. For example, an "add" instruction in pool A is picked into an instruction group only once it has been determined whether any higher priority instructions have been placed which require, for example, issue port M0 or I0.

Linking occupancy of the hierarchical pools prevents resource over subscription. Each instruction group is prepared correctly in a single pass ("right first time").

FIG. 12 shows an example instruction group 606 picked from the instructions $T_1$-$T_6$ placed in FIG. 11. This group conforms to the template "MFI-MFI$_s$". The template is coded into the 5-bit template fields carried within the instruction group. In FIG. 12, "S" shows that the second bundle is the end of the group.

The preferred example arrangement shown in FIGS. 7, 10 and 11 allocates instructions to the M, I and F instructions slots. This arrangement is particularly suitable in block-by-block code conversion. That is, a basic block by definition contains only one branch-type exit. The main work of the block relates to non-branching instructions, which are prepared into instruction groups using the pool structure of FIG. 7. Hence, the prepared code is formed into a sequence of complete and efficient instruction groups for the main part of the block. A tail part of the block may contain incomplete groups with NOPs, due to the limited remaining candidate instructions. The final instruction group or groups contain the branching instructions. These branching instructions suitably determine a subsequent block in the code to prepare and execute next. In the example embodiment discussed above with reference to FIG. 2, the branch instructions suitably return control to the translator run loop 190, with an indication of the next basic block.

Figure 13:
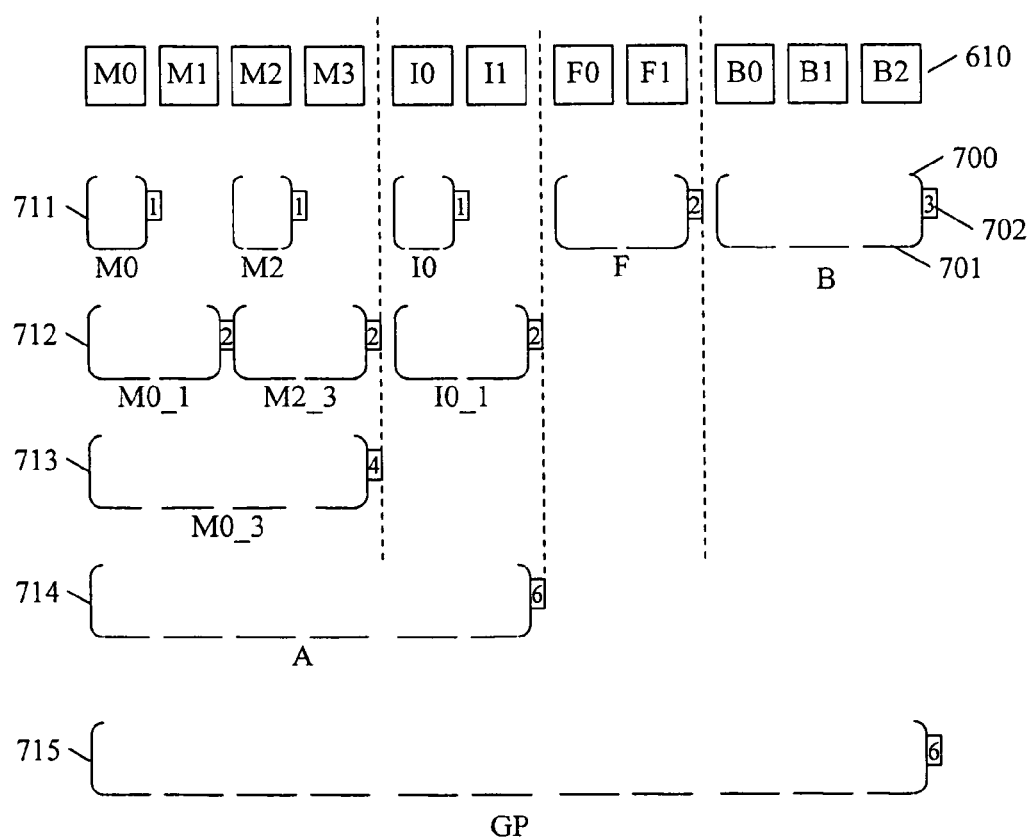
FIG. 13 shows another embodiment of the preferred mechanism for preparing instruction groups.

FIG. 13 shows another preferred pool structure. In this embodiment, the preferred pool mechanism is extended to also include pools related to the branch issue ports (i.e. B0_2).

Figure 14:
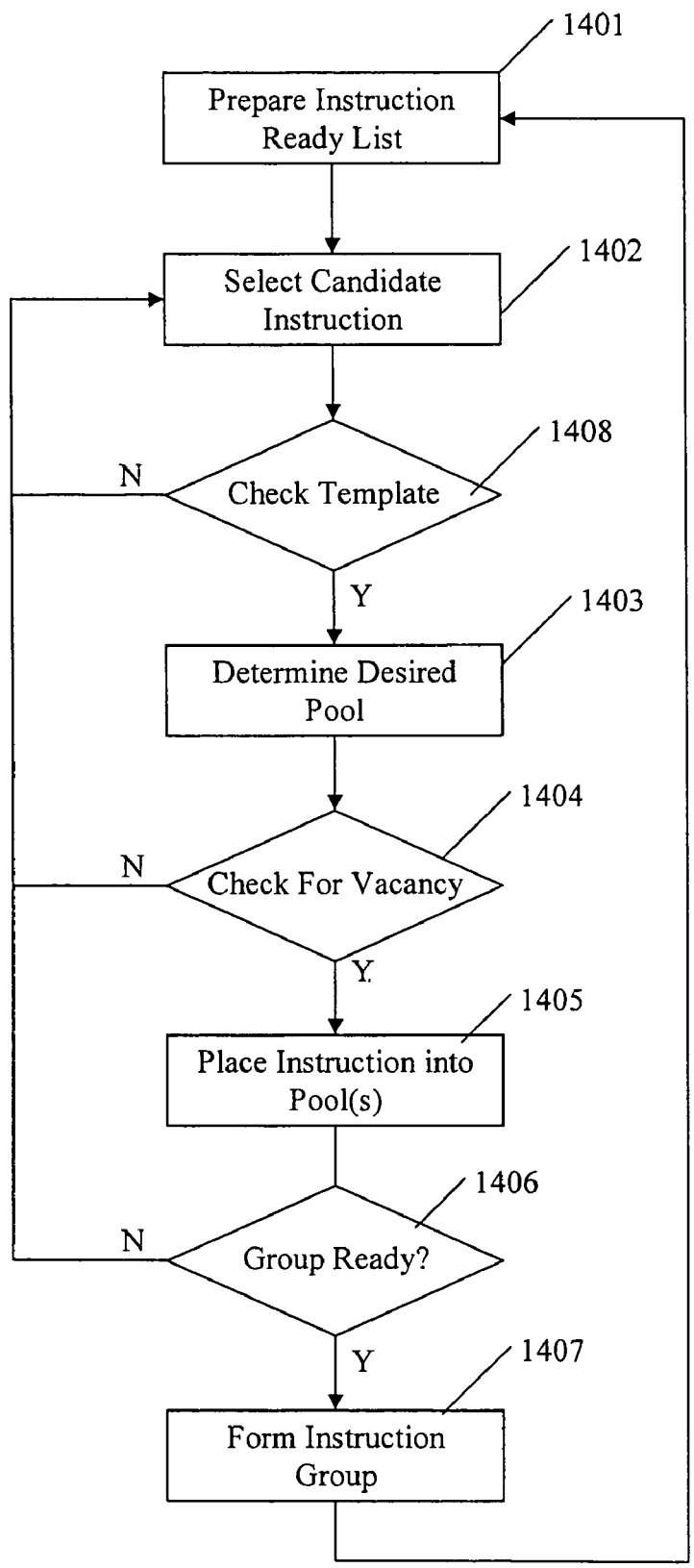
FIG. 14 is a schematic flow diagram showing another preferred method of preparing instruction groups.

FIG. 14 shows a further preferred method of preparing instruction groups. The method suitably uses a pool structure as shown in FIG. 13.

As shown in FIG. 14, the preferred method includes the steps 1401 to 1407 equivalent to steps 901 through 907 in FIG. 9. Also, in this embodiment the method includes the step 1408 of checking the selected instruction against a set of templates.

In the example Itanium 2 processor, combinations of M, F, and I instructions have relatively few restrictions, which are suitably handled by the pool structure of FIG. 9. However, combinations of I, F and B instructions are relatively restrictive as to the permissible combinations. Step 1408 comprises comparing the combination of the selected candidate instruction 821 and any already placed instructions, with a predetermined set of templates. Each template represents a valid instruction combination which is executable by the target processor. The set of templates are conveniently held in a look up table stored such as in memory 18. If the proposed combination does not match any of the predetermined set of templates, then the selected candidate instruction is rejected back to the ready list and a new candidate selected. The template check of step 1408 allows branch instructions to be included within the instruction group preparation using the pools.

The Itanium 2 processor also provides a special-case "X"-type instruction, which requires a MLX format template. An X-type instruction requires both an F issue port and an I issue port. The template check of step 1408 readily identifies the X-type instructions. Suitably, X-type instructions are handled as a special case, by attempting to place both an F and an I type instruction into the allocation pools 700. The X-type instruction is successfully placed only if both of the I and F are placed successfully. That is, this is an example whereby one target code instruction requires more than one instruction space in the pool structure. The pool structure conveniently caters for these instructions of unusual or varying occupancy.

The preferred embodiments of the present invention have been illustrated with reference to an example Itanium® 2 processor. However, the present invention is also applicable to many other processors and processor types. In particular, the present invention is applicable to processors which issue multiple instructions per cycle. As examples, the present invention is also applicable to x86-architecture processors, and PowerPC (PPC)-architecture processors, amongst others. The present invention is adaptable by the skilled person based on the principles and features explained herein.

In summary, the preferred embodiments of the present invention as described herein provide a convenient automated mechanism of preparing instruction groups ready for dispersal to functional units of a processor through a plurality of issue ports. The instruction groups are generated accurately and automatically. Decoding errors and stalls are minimised or even completely avoided.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of forming an instruction group for dispersal through a plurality of issue ports to functional units of a processor, comprising:
   providing a plurality of pools, each pool being associated with one or more of the issue ports and including at least a first pool and a second pool having at least one issue port in common and wherein the first pool has at least one instruction space and the second pool has at least one more instruction space than the first pool;
   placing instructions into the pools according to instruction type, wherein placing an instruction into the first pool reduces the number of instruction spaces in the first pool and also reduces the number of instruction spaces of the second pool;
   creating an instruction group from the placed instructions;
   dispersing the instruction group through the issue ports to the functional units of the processor; and
   executing the instruction group by the processor.

2. The method of claim 1, wherein the plurality of pools form a hierarchical structure where the first pool is superior to the second pool.

3. The method of claim 2, wherein the first pool is associated with fewer of the issue ports than the second pool.

4. The method of claim 1, wherein:
   the instruction spaces contain at most a predetermined number of instructions.

5. The method of claim 1, wherein each pool has a predetermined maximum occupancy and placing an instruction reduces available occupancy of at least the first and second pools.

6. The method of claim 5, comprising placing an instruction into the first pool only when the first pool and the second pool both have available occupancy to accept the instruction.

7. The method of claim 5, comprising placing an instruction into the first pool only when the first pool and the second pool are both not already at their respective predetermined maximum occupancy.

8. The method of claim 1, wherein
   the providing step comprises providing each of the plurality of pools associated with a counter value representing placed instructions and a threshold value representing maximum occupancy of the pool in an instruction group; and
   the placing step comprises:
   comparing the counter value with the threshold value to confirm that the first and second pools are able to accept the instruction; and
   adjusting the counter value of the first pool each time an instruction is placed into the first pool and adjusting the counter value of the second pool each time an instruction is placed into the first pool.

9. The method of claim 8, comprising initializing the counter value to a predetermined maximum occupancy of the pool in an instruction group, decrementing the counter value for each placed instruction, and comparing the counter value with a threshold value of zero.

10. The method of claim 8, comprising restricting maximum occupancy for at least one of the plurality of pools to less than an absolute maximum for the one pool as determined by the issue ports associated with the one pool and/or by instruction types associated with the one pool.

11. The method of claim 1, comprising placing an instruction of a particular type by reducing occupancy of the first and second pools, and by reducing occupancy of a third pool which is not subsidiary to either of the first and second pools.

12. The method of claim 1, further comprising providing a group pool representing a maximum number of instructions of an instruction group, and adjusting occupancy of the group pool each time an instruction is placed into any other of the plurality of pools.

13. The method of claim 1, comprising the steps of:
    forming a ready list of candidate instructions;
    selecting a candidate instruction from the ready list; and
    placing the candidate instruction into one of the plurality of pools.

14. The method of claim 13, wherein the candidate instructions in the ready list are each independently executable.

15. The method of claim 14, comprising adding a candidate instruction to the ready list after any dependencies are fulfilled by previously placed candidate instructions.

16. The method of claim 15, comprising converting a section of subject code into a block of target code instructions, and selectively adding target code instructions from the block to the ready list.

17. The method of claim 1, wherein the creating step comprises picking the placed instructions from the pools in sequence to create the instruction group.

18. The method of claim 1, comprising performing the creating step once a predetermined maximum number of instructions have been placed into the pools to fill the instruction group, or no further instructions are appropriate to be placed into the plurality of pools.

19. The method of claim 1, further comprising the step of checking a combination of placed instructions against a set of templates.

20. The method of claim 1, comprising forming a candidate combination of an instruction to be placed in the plurality of pools together with zero or more instructions already placed in the plurality pools, and checking the candidate combination against a set of templates that represent instruction combinations which are validly executable in the functional units of the processor.

21. The method of claim 1, wherein the issue ports serve M, F and I type instructions and wherein the plurality of pools are associated with the issue ports serving M, F, and I type instructions.

22. The method of claim 20, wherein the issue ports further serve a B type instruction and wherein the plurality of pools are associated with the issue ports serving M, F, I and B type instructions.

23. A method of preparing an instruction group of target instructions for dispersal through a plurality of issue ports to functional units of a target processor, from subject instructions executable by a subject processor, the method comprising:
    generating a block of target instructions from the subject instructions;
    placing a set of the target instructions into a plurality of pools, each pool being associated with a subset of the issue ports in an overlapping hierarchical structure having superior narrower pools associated with fewer instruction ports than subsidiary wider pools, and reducing availability in a subsidiary wider pool in response to each placing of one of the set of target instructions into a superior narrower pool in the hierarchical structure;
    forming an instruction group from the placed set of target instructions;
    dispersing the instruction group through the issue ports to the functional units of the target processor; and
    executing the instruction group by the target processor.

24. The method of, claim 23, comprising placing a target instruction into a wider pool in preference to a narrower pool where an instruction is applicable to both the narrower pool and the wider pool.

25. The method of claim 23, further comprising providing a counter value for each pool representing a number of instructions placed in the pool or any superior pool, and consulting the counter value to determine whether the pool or any subsidiary pool is full prior to placing an instruction.

26. The method of claim 25, further comprising providing a group pool having a counter value representing a maximum number of instructions in an instruction group, and altering a counter value of the group pool each time an instruction is placed into any other of the plurality of pools.

27. The method of claim 23, wherein the placing step further comprises the steps of:
updating a ready list of candidate instructions from the block of target instructions, wherein the candidate instructions are each executable independently of each other;
taking a candidate instruction from the ready list;
determining a desired pool appropriate to the candidate instruction with respect instruction type; and
confirming that the desired pool and each of any subsidiary pools of the desired pool have availability to accept the candidate instruction and if so then placing the candidate instruction into the desired pool thereby reducing availability in the desired pool and the or each subsidiary pool accordingly, or else repeating for a next candidate instructions until the set of target instructions have been placed ready to form an instruction group.

28. The method of claim 27, comprising updating the ready list each time an instruction group is formed from the set of target instructions placed into the plurality of pools.

29. The method of claim 27, comprising taking the candidate instruction based on any one or more of: age in the ready list, latency of the candidate instruction, or cumulative latency of the candidate instruction combined with latency of one or more dependent target instructions in the block.

30. The method of claim 27, comprising determining the desired pool according to an instruction type and an appropriate issue port or ports for the candidate instruction.

31. The method of claim 27, comprising determining that an instruction group is ready from the set of instructions placed in the pools when a predetermined number of instructions have been placed, or no further instructions can be placed from the ready list.

32. The method of claim 31, comprising forming an instruction group including one or more non-operative instructions to fill a partially-complete instruction group.

33. The method of claim 23, further comprising the steps of:
dividing the subject code instructions into blocks and selecting a first current block of subject code;
converting the current block of subject code into a current block of target code through dynamic binary translation, including preparing target instructions in the block of target code into instruction groups;
executing the current block of target code using the instruction groups, including determining a next current block of subject code; and
repeating the converting and/or executing steps for the next current block of subject code.

34. A computer-readable storage medium having software resident thereon in the form of computer-readable code executable by a computer to perform a method of preparing an instruction group of target instructions for dispersal through a plurality of issue ports to functional units of a target processor, from subject instructions executable by a subject processor, the method comprising:
providing a plurality of pools, each pool being associated with one or more of the issue ports and including at least a first pool and a second pool having at least one issue port in common and wherein the first pool has at least one instruction space and the second pool has at least one more instruction space than the first pool;
placing instructions into the pools according to instruction type, wherein placing an instruction into the first pool reduces the number of instruction spaces in the first pool and also reduces the number of instruction spaces of the second pool; and
creating an instruction group from the placed instructions.

35. A system comprising:
a target processor having a plurality of functional units and a plurality of issue ports for dispersal of an instruction to the plurality of functional units; and
translator code to perform program code conversion of a subject program into target code executable by the target processor, including:
providing a plurality of pools, each pool being associated with one or more of the issue ports of the target processor and including at least a first pool and a second pool having at least one issue port in common and wherein the first pool has at least one instruction space and the second pool has at least one more instruction space than the first pool;
placing instructions into the pools according to instruction type, wherein placing an instruction into the first pool reduces the number of instruction spaces in the first pool and also reduces the number of instruction spaces of the second pool; and
creating an instruction group from the placed instructions.

36. A computer-readable storage medium having software resident thereon in the form of computer-readable code executable by a computer to perform a method of preparing an instruction group of target instructions for dispersal through a plurality of issue ports to functional units of a target processor, from subject instructions executable by a subject processor, the method comprising:
generating a block of target instructions from the subject instructions;
placing a set of the target instructions into a plurality of pools, each pool being associated with a subset of the issue ports in an overlapping hierarchical structure having superior narrower pools associated with fewer instruction ports than subsidiary wider pools, and reducing availability in a subsidiary wider pool in response to each placing of one of the set of target instructions into a superior narrower pool in the hierarchical structure; and
forming an instruction group from the placed set of target instructions.

37. A system comprising:
a target processor having a plurality of functional units and a plurality of issue ports for dispersal of an instruction to the plurality of functional units; and
translator code to perform program code conversion of a subject program into target code executable by the target processor, including performing the steps of:
generating a block of target instructions from the subject instructions;

placing a set of the target instructions into a plurality of pools, each pool being associated with a subset of the issue ports in an overlapping hierarchical structure having superior narrower pools associated with fewer instruction ports than subsidiary wider pools, and reducing availability in a subsidiary wider pool in response to each placing of one of the set of target instructions into a superior narrower pool in the hierarchical structure; and forming an instruction group from the placed set of target instructions.

* * * * *